(12) United States Patent
Villalobos Lopez

(10) Patent No.: US 10,323,396 B2
(45) Date of Patent: Jun. 18, 2019

(54) WAY OUT VALVE FOR URINALS WITH DOUBLE LITTLE BALL

(71) Applicant: Helvex, S.A. de C.V., Mexico City (MX)

(72) Inventor: Arturo Villalobos Lopez, Mexico City (MX)

(73) Assignee: Helvex, S.A. de C.V., Mexico City (MX)

( * ) Notice: Subject to any disclaimer, the term of this patent is extended or adjusted under 35 U.S.C. 154(b) by 0 days.

(21) Appl. No.: 15/804,497

(22) Filed: Nov. 6, 2017

(65) Prior Publication Data

US 2019/0136495 A1    May 9, 2019

(51) Int. Cl.
*E03C 1/298* (2006.01)
*F16K 15/04* (2006.01)
*A47K 11/12* (2006.01)
*F16K 31/20* (2006.01)

(52) U.S. Cl.
CPC .............. *E03C 1/298* (2013.01); *A47K 11/12* (2013.01); *F16K 15/042* (2013.01); *F16K 31/20* (2013.01)

(58) Field of Classification Search
CPC ................................. E03C 1/298; F16K 15/04
USPC ................................. 4/144.1–144.4; 137/202
See application file for complete search history.

(56) References Cited

U.S. PATENT DOCUMENTS

| 6,286,153 | B1 * | 9/2001 | Keller | ..................... E03C 1/281 |
| | | | | 4/144.1 |
| 2013/0205483 | A1 * | 8/2013 | Lagobi | ..................... E03C 1/281 |
| | | | | 4/144.1 |
| 2018/0291605 | A1 * | 10/2018 | Subramanian | .......... E03C 1/298 |

* cited by examiner

*Primary Examiner* — Christine J Skubinna
(74) *Attorney, Agent, or Firm* — Hoglund & Pamias, PSC; Roberto J. Rios

(57) ABSTRACT

A way out valve for urinal with double little ball, characterized by being formed by two chambers, one lower and one upper, with small balls that move to let the liquids deposited in the urinal pass or seal and prevent the exit of gases of drainage; the upper chamber has truncated cone base that, when it has liquid, floats the ball that is in this chamber and allows the liquids to pass to the lower chamber; the lower chamber has an inclined roof that allows, on its upper face, to slide the liquids up to the vertical passage that transports the liquids to the lower chamber, passing them through the lower orifice; the lower chamber has a central perforation in its inclined floor where the liquids of this chamber pass to the liquid conduit towards the drainage.

12 Claims, 3 Drawing Sheets

WAY OUT VALVE FOR URINALS WITH DOUBLE LITTLE BALL

TECHNICAL FIELD

The present disclosure is related with the bathroom accessories manufacturing industry, with products such as faucets, showers, toilet seats among others. It is more specifically related with the manufacture of valves for dry urinals which allows the passing of urine avoiding unpleasant odors.

BACKGROUND

There are different gadgets for the same application; however the difference between our device and others is that other units are based on a little ball that acts like a valve, allowing the passing through of fluids without coming back. This devices consists on a storage or chamber that contains the liquids and within this chamber there is a sphere that when the chamber is filled with fluid it floats above the surface of the fluid and allows it to pass through an orifice. As the level of urine decreases, the sphere descends until it sets in the base of the device and by its own weight seals the orifice, this is optimal and stable.

This is because there is no relation in this devises between the diameter and weight of the little ball with the conicity of the base and the diameter of the exit pierce. In the case of the ball if it is too light, it will allow an almost instant drainage with too little residual urine, but since It is so light the mere pressure of the drain gases that normally is of 0.1 bar, may provoke that the ball floats easily allowing the passing of bad odors; on the opposite case if the ball has a superior weight it will allow a good seal, but It will provoke a urine saturation that in some cases may even be visible in the urinal, besides it will generate a greater amount of residual urine, as for the base or ball base in this devices there still isn't a known relation between the conicity and the exit pierce, for that reason this units won't have an optimal functioning, either because there is no relation between the diameter and the weight with respect to the little ball or because there is no relation between the little ball with the conicity and the diameter of the liquid exit pierce.

As some example of the devices of the state of the art we can mention the disclosed units in the Mexican patents WO2012141565 and the WO2012039593, both property of Helvex S.A. de C.V. Also relevant is PCT patent application WO2012064167 that is property of Helvex S.A. de C.V.

Structurally the sealing device for the dry urinal shown in this register is characterized to include a storage with a base in the bottom of the chamber with a decline conformation toward the center and a sphere that whenever the urinal is not being used seals with its weight the exit orifice of the base, and when the urinal its being used and the urine level reaches a certain level this sphere floats and stops sealing allowing the passing through of the urine from the chamber and into the drain, through the base orifice.

Nevertheless, even when the weight of the little ball is taken into consideration, there is no consideration regarding the relation of the diameter with the weight of the sphere neither is related the sphere with the diameter of the exit and the inclined plain of the base, for that reason since it is not taken into consideration such links, it makes that the device lacks of a stable sealing and with a greater amount of residual urine, that generates bad odors.

However, even though the design of this valves has improved in many ways, this improvement can't go further, because since the gas pressure is variable in the drainage, if the little ball was designed to be too heavy as to resist any pressure, it may put at risk the opening by floatation of the little ball. Namely, the urine passes through the exit because the little ball floats, and accordingly with Archimedes principle, it will float whilst the dislodged liquid (the urine that makes the little ball float) has the weight of the little ball.

Therefore, if the little ball is designed to be too heavy as to assure that the seal will prevent the passing of the drain gases, two thing occur, on one side that the residual urine in the chamber is too much and will any way provoke bad odors where the chamber is located in the urinal, or that in order for the ball to float and have the proper weight is designed to be too big, and it will be necessary to design a larger valve with a larger base, increasing the valve's selling price and calling for the urinal to be redesigned with all the implications in the design change.

Until now there have been 3 principles to achieve the seal that allows dry urinals to be accepted. The first was a hydraulic oil seal that allows the passage of urine to the drain and having a density greater than the oil and being Immiscible, then the urine passes and the oil serves as a barrier to drainage gases. This way of performing the seal has the inconvenient that the oil is dragged to the drain progressively and from time to time it must be changed.

The other is the seal provoked by the adhesive qualities of the internal walls of a very flexible hose, that from the effect of the liquid's weight that tries to circulate within it, expands its walls, allowing this way for the liquid to pass through, and once the weight stops acting the walls adheres among them sealing the passing through of the drain gases. In this case the same pressure of the gases tends to unite the walls provoking a better seal. This structure takes advantage of the pressure that is generated from the gases that are meant to be stopped, in order to prevent its exit. The problem with this seal is that the salts contained in urine will progressively be embedded in the walls and the seal will be increasingly inefficient requiring a frequent maintenance.

Finally we have the little ball seal that has already been analyzed and has a very good performance but has the inconvenience of not responding to normal changes of the pressure of the drain gases.

On the other hand, many of the valves for urinals allows the passage of bad odors coming from the drainage, many do not resist cleaning with commonly used chemicals, such as chlorine, sarricides, detergents, etc.

Also the useful life of many is very short, having to be doing corrective maintenance frequently.

SUMMARY

One of the objectives of this disclosure is to achieve a valve mechanism to dry urinal that the some way responds to the pressure change of the gases in the drain.

Another objective is that this valve be aided in its seal by the own pressure of the drainage gases.

Still another objective is that of not having to modify the dimensions of the valve for situations in which the pressure of the drainage gases is relatively high.

Still another objective is to make possible a valve that regardless of the normal pressure in some geographical area, the size of the urinal will not be modified.

Another objective is to achieve a valve with a long service life, resistant to chemical cleaning products and to guarantee the seal to avoid odors.

And all those objectives and advantages which will be a patent from the reading of the present description and the drawings which, for illustrative purposes, but which are not limitative, are appended hereto and form an integral part thereof.

The structure of the valves that given body to the present disclosure are valves with two chambers, one on top of the other, with a sphere in each chamber. These spheres settle in holes to seal them; in the case of the sphere or ball of the upper chamber, the sealing is carried out by the own weight of the ball, whose seat where the hole is located is truncated cone to allow the ball to always move towards the center, where it is the orifice.

The lower ball, while sealing by its own weight, is also aided by the own pressure of the existing gases in the drain. The lower chamber where the ball is has an inclined floor that makes the ball sit on two holes, when there are no circulating liquids that move the ball away from the holes.

The holes on which the ball sits are two, the one on the wall and the one on the floor. Then, when there is no liquid circulating, the top ball seals with its seat, by the own weight of said ball and then this makes one of the seals. The lower ball by its own weight rolls on the inclined plane that is the floor of the lower chamber, and seals on the two holes the lower wall of said chamber, and the one on the inclined floor.

In the floor of the lower chamber, in addition to the hole near the hole in the wall, it has a second hole through which the drainage gases will penetrate, when doing this penetration, the pressure of the drainage gases will generate a pressure in the lower chamber and this pressure will contribute to the settlement of the ball on the two holes, that of the wall and the neighbor of this on the floor. This pressure, together with the weight of the ball, achieve the second seal.

This operation is a more efficient seal on the valve, since the same pressure of what you want to prevent it from coming out, is what the seal achieves.

To achieve this performance, it was necessary to mechanically design the spheres to seal their respective cavities when there is no fluid flow in the system, and looking for that this allows the passage of these achieving by difference of densities the opening of superior sphere and that the column of fluid pushes the sphere that is in the inferior part in an inclined plane.

The inclined plane of the lower cavity allows the sphere to seal by gravity in the cavity, being in this position the counter-pressures that could arise are obstructed avoiding the filtrations of gases.

On the other hand, the partial roof of the second chamber also has an inclination that allows liquids arriving from the upper chamber to fall into the lower chamber to continue its path towards drainage. The inclination of the roof leads the liquids to an empty space that is located from the upper part of the lower chamber to the lower part of the wall perforation.

When the liquids enter the lower chamber, these liquids push the lower ball that stops to settle in the hole of the floor that is next to the hole in the wall. With this, the seal of the perforation floor is released and it is through this pierce that the liquids pass to the drain.

When the liquids stop flowing, the upper little ball falls in the center of the central perforation and seals the upper chamber. The lower ball, by gravity rolls on the inclined floor and comes up against the two holes, the lower one of the wall of the lower chamber and the one of the inclined floor. The weight of the ball, obviously due to gravity, seals these two holes.

But there is an additional force that these two seals reinforce, the pressure of the drainage gases that when pushing on the lower ball increases the sealing and therefore prevents the drainage gases from returning.

Now we will describe our disclosure with degree of habilitation based on the figures that illustrate some modalities of the disclosure.

DETAILED DESCRIPTION

The object of the present description is reflected in the way out valves for dry urinals, with double seal of little ball. The valve has two chambers, one on top of the other and a communication passage from top to bottom, in a lateral position. The upper chamber is the same as the current Helvex™ ball seal.

The lower chamber is formed by a cylinder whose lower base (floor) and whose upper base (roof) are inclined. The ceiling receives on its upper side the liquids that let pass the little ball of the upper chamber when floating due to the presence of liquid, with the inclination of the roof, the liquids slide towards the lateral communication passage. At the end of the vertical passage, the wall of the lower chamber has a bore or hole, which allows liquids to push the little ball of the lower chamber and these slide to the floor of the chamber and exit through one of the holes said floor, towards the drain. This we could call it the phase of eviction of liquids.

In particular, we will have to say that the column of the fluid that accumulates in the vertical passage between the upper and lower chambers manages to overcome the weight of the lower sphere by the pure weight of the fluid column, allowing it to drain, and when this stops flow the mechanism closes the cavity, due to the inclined plane, sealing the duct of bad odors.

In the closing phase of the valves, in the absence of liquids that make the upper ball float and push the lower ball, the upper ball seals in the seat and the lower ball by its own weight, and the tilt of the floor of the chamber lower. Seals the lower bore or hole.

The seal in the lower little ball is secured with the pressure exerted by the drainage gases. These gases enter the lower chamber through the orifice of the inclined floor, located on the side opposite the holes and tend to exit through the lower hole of the wall, when exerting this pressure they push the ball on this hole and seal even more than just the partial weight of the ball.

Figure 1:
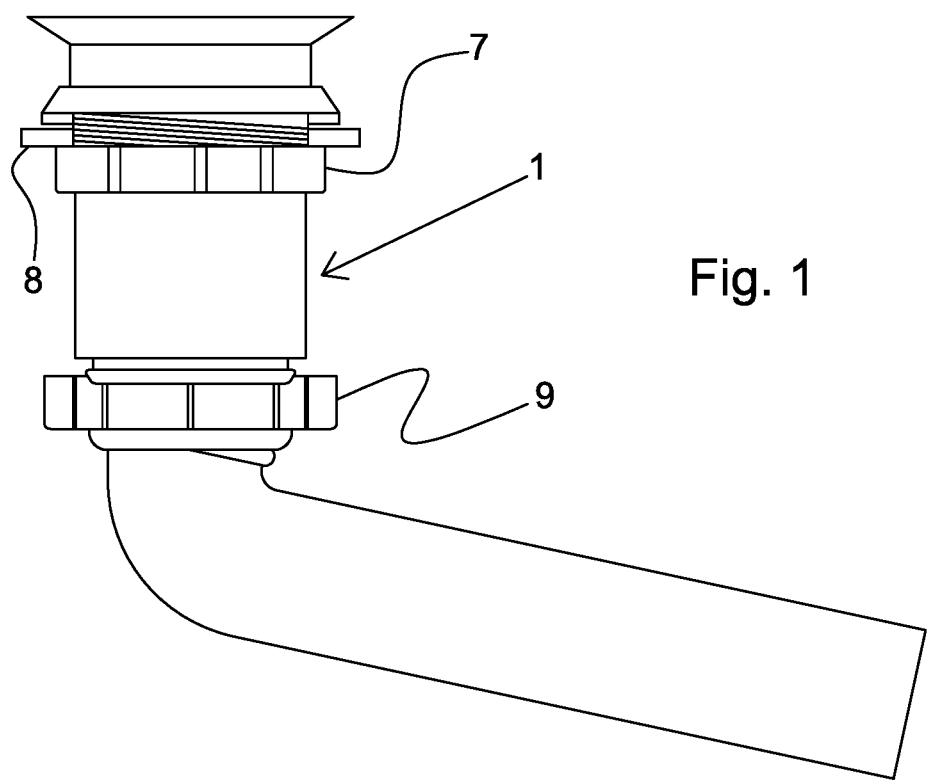
FIG. 1 illustrates the external appearance of the valve with double little ball.

FIG. 1 illustrates the external appearance of the double ball valve object of the present disclosure. In this figure you can see the following elements, the main body 1 that contains the spheres and the seats in which they seal.

The nut 9 that allows to fix the valve to the pipe that will be connected directly to the drain or through another pipe. In the upper part, there is the locknut 7 that will fix the valve to the urinal, and the packing 8 to seal any runoff and allow an interface between the valve and the urinal.

Figure 2:
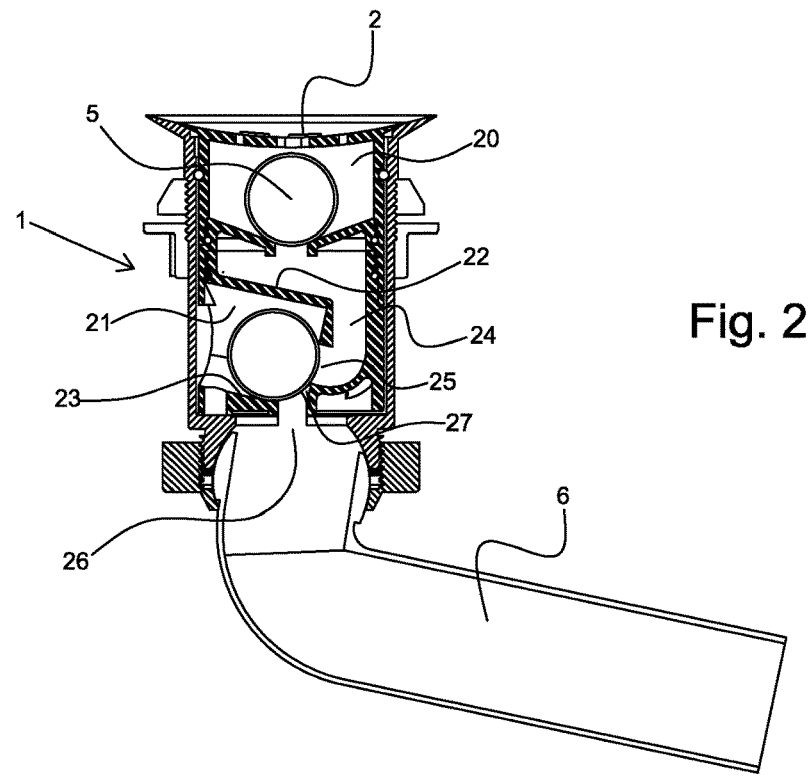
FIG. 2 illustrates the inside of the valve with double little ball, with the position of these, sealing the holes.

FIG. 2 illustrates the inside of the double little ball valve, with the position of these, sealing the corresponding holes.

The main body 1 comprises in its interior the upper chamber 20, the lower chamber 21, with its roof 22 and floor 23 inclined, as well as the vertical passage 24 that opens into the lower hole 25 of the wall and the hole 26 where the Liquids will pass to tube 6 that will lead them to drain.

The orifice 27 is the passage of the drainage gases to the lower chamber and which will contribute with the own weight of the little ball to seal the holes 25 and 26.

Also inside to the main body 1 is located the strainer 2, consisting of a hollow cylinder, open by the lower end and in the upper lid a series of perforations for the passage of liquids.

The truncated cone floor of the upper chamber 20, prevents that with the lack of liquids the upper ball 5 is positioned in another place that is not the seat of the valve. The lower chamber 21 has the roof and the sloped floor. The inclination of the roof is so that the upper face allows the liquid to run off to the vertical passage 24 and the inclination of the floor is so that its upper face allows to the lower ball to move rolling to it meets the wall of the chamber and seal on the holes 25 and 26.

The other numbers, with the elements they indicated, were already mentioned in the description of FIG. 1.

Figure 3:
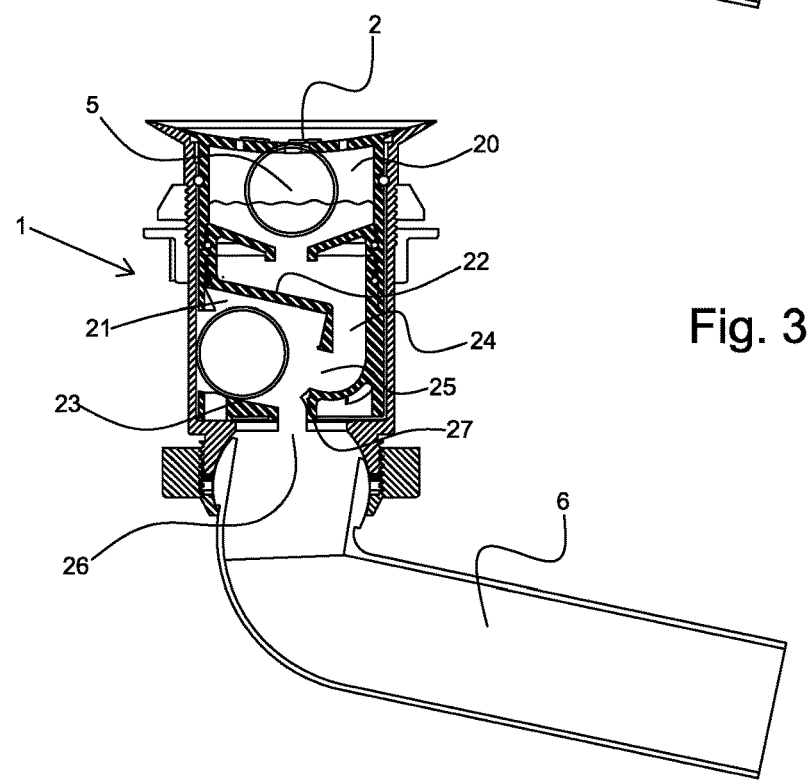
FIG. 3 illustrates the inner chambers in the open position of both little balls.

FIG. 3 illustrates the inner chambers in the open position of both balls. These elements are the same as described in the description of FIGS. 1 and 2, the difference is the position of the little balls 5 since have liquid in the chambers. The upper ball is floating and the lower ball is displaced towards the opposite end where are located the two neighboring holes of floor and wall. In this position of the balls, the liquids flow through the upper chamber seat, they slide on the upper face of the ceiling of the lower chamber to deposit them in the vertical passage 24 which takes it to the lower orifice 25 of the wall and through this orifice the liquids pass to the lower chamber later leaving through the central orifice 26 of the floor of the lower chamber to transport them towards the drainage.

Figure 4:
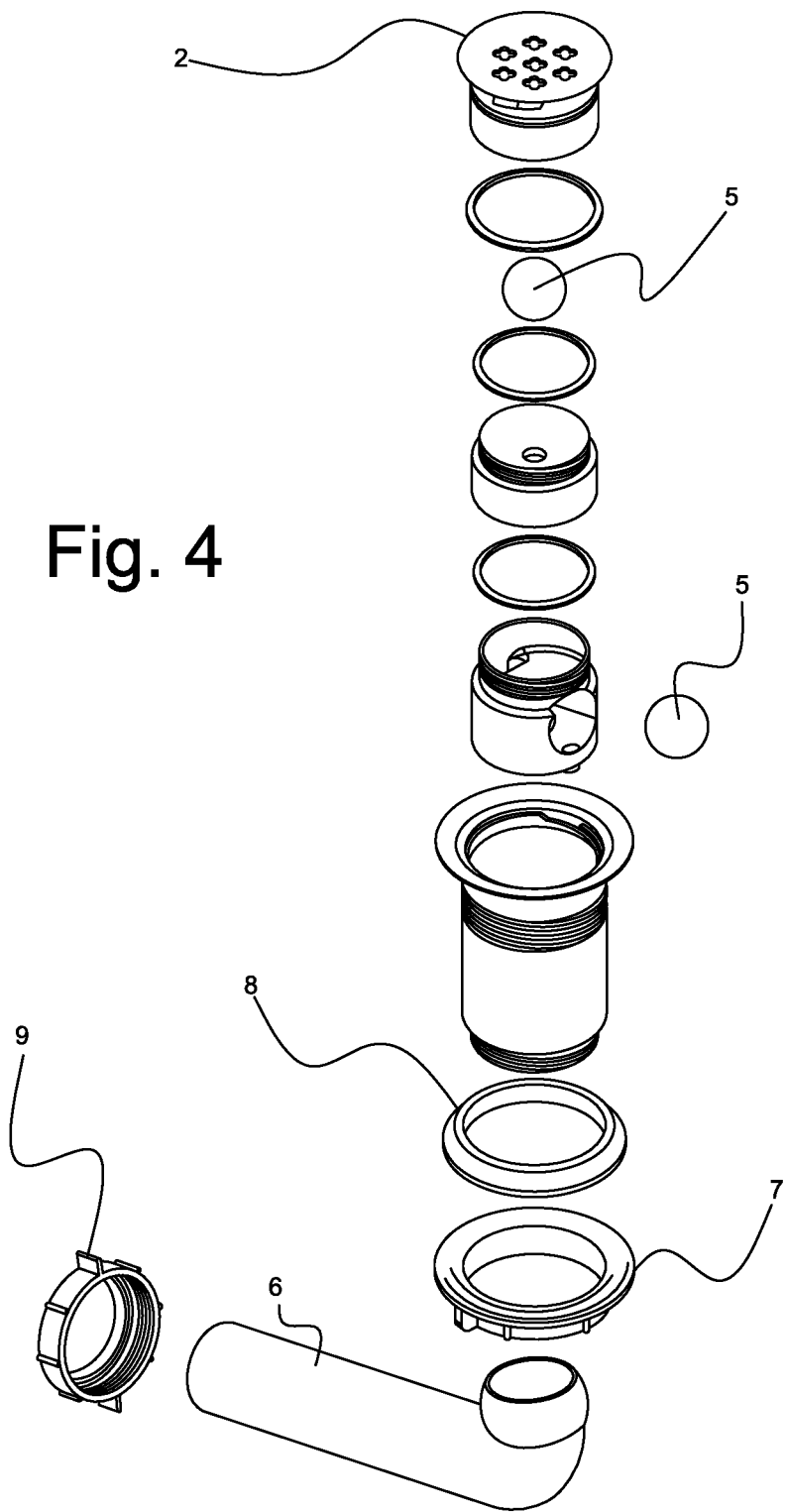
FIG. 4 is an exploded view of the double little ball valve for sealing the drainage gases.

FIG. 4 is an exploded view of the double little ball valve for sealing the drainage gases, all the elements located in this figure were already described in the previous figures and this figure only allows to see other facets of some elements.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A urinal exit valve comprising:
    a top chamber including a top ball and a bottom chamber including a bottom ball, said top and bottom balls move to allow the passage of liquids received on a urinal or to seal an exit drain to prevent the flow of drain gases;
    said top chamber has a truncated-cone shape so that said top ball floats allowing the passage of liquid into said bottom chamber when said top chamber contains liquid;
    said bottom chamber has an inclined ceiling with an upper surface directing the liquid exiting said top chamber into a vertical passage that directs said liquid into a side opening of said bottom chamber;
    said bottom chamber has an inclined floor with a central opening where the liquid exits to said exit drain and a gas opening receiving said drain gasses so that the bottom ball is pushed against said side opening and said central opening; and
    said top chamber and said bottom chamber are enclosed inside a main body.

2. The urinal exit valve of claim 1, wherein said inclined floor allows the bottom ball to roll by gravity towards said side opening and said central opening sealing said side opening and said central opening in the absence of liquid.

3. The urinal exit valve of claim 1, wherein said vertical passage is defined by an exterior surface of said bottom chamber and an interior surface of said exit valve.

4. The urinal exit valve of claim 1, wherein a floor of said top chamber comprises a hollow cylinder with a lower opening and an upper opening.

5. The urinal exit valve of claim 1, further comprising a strainer chamber having a hollow cylinder shape with a lower end opening and an upper lid having a plurality of openings that allow the passage of liquid into said top chamber.

6. The urinal exit valve of claim 5, wherein said main body comprises an upper thread where said strainer chamber is threaded; a side thread provided on an external side surface of said main body where a fixation nut is threaded to attach said main body to said urinal; and a lower thread where another fixation nut is threaded to attach an end of a drain pipe to said main body.

7. The urinal exit valve of claim 5, wherein the lower end opening of said strainer chamber is threaded to an upper end of said top chamber and an upper end of said bottom chamber is threaded to a lower end of said top chamber so that said strainer chamber, said top chamber and said bottom chamber form a single cartridge that is inserted into said main body.

8. The urinal exit valve of claim 7, wherein said single cartridge is attached to said main body by a thread provided on said strainer chamber.

9. The urinal exit valve of claim 5, wherein a gasket is provided between the strainer chamber and the main body.

10. The urinal exit valve of claim 5, wherein a gasket is provided between the strainer chamber and top chamber.

11. The urinal exit valve of claim 5, wherein a gasket is provided between the top chamber and the bottom chamber.

12. The urinal exit valve of claim 6, wherein a gasket is provided between said fixation nut and said urinal.

* * * * *